United States Patent [19]

Nishimoto

[11] Patent Number: 4,549,297
[45] Date of Patent: Oct. 22, 1985

[54] DATA RETRANSMITTING SYSTEM
[75] Inventor: Masato Nishimoto, Kanagawa, Japan
[73] Assignee: Fuji Xerox Co., Ltd., Tokyo, Japan
[21] Appl. No.: 472,466
[22] Filed: Mar. 7, 1983
[30] Foreign Application Priority Data
 Mar. 8, 1982 [JP] Japan .................................. 57-35176
[51] Int. Cl.$^4$ ............................................ G06F 11/00
[52] U.S. Cl. ...................................................... 371/33
[58] Field of Search ...................................... 371/33, 62
[56] References Cited
U.S. PATENT DOCUMENTS
 3,754,211 8/1973 Rocher et al. .......................... 371/33

Primary Examiner—Jerry Smith
Assistant Examiner—Mark Ungerman
Attorney, Agent, or Firm—Sughrue, Mion, Zinn, Macpeak & Seas

[57] ABSTRACT

A data retransmitting system in which data is transmitted in data frames having a predetermined length and an answer signal is transmitted back from the signal receiving side upon reception of each data frame. A measuring frame is transmitted from the signal transmitting side prior to the start of data transmission. A transmission delay time is measured from a time difference between transmission of the measuring frame and reception of an answer signal to said measuring frame from the signal receiving side according to the transmission delay time, a frame length for each data frame and a monitoring time which elapses the time instant that each frame has been transmitted until the corresponding answer signal is detected. When, with respect to each data frame having the frame length thus determined, no answer signal is detected within said monitoring time thus determined the data is retransmitted.

10 Claims, 5 Drawing Figures

DATA RETRANSMITTING SYSTEM

BACKGROUND OF THE INVENTION

This invention relates to a system of retransmitting data upon occurrence of errors in a data transmitting device. More particularly, it relates to a data retransmitting system which, upon occurrence of errors in data transmission, can effectively retransmit the data irrespective of transmission distance.

In data transmission over communication lines, data errors occur because of noise in the communication lines or the like. When such an error occurs, its effect is increased as the data compression rate increases. In general, a high speed data transmitting system cannot sufficiently deal with the effects of such errors. Accordingly, a system is generally employed in which, when errors occur, they are corrected by retransmitting the data.

For instance, in a digital facsimile system using telephone networks, data to be transmitted is divided into frames, which are successively transmitted. In such a system, the data of each frame is checked on the signal receiving side, so that, when the error is higher than a reference value, a "negative acknowledge" tone for correcting the error is transmitted to the signal transmitting side. When the error is lower than the reference value, an "acknowledge" tone is transmitted to the signal transmitting side. These replies are generally sent to the signal transmitting side before the next frame is transmitted. In this case, the length of each frame (hereinafter referred to as "a frame length", when applicable) should be longer than a transmission delay time between signal transmission and reception. Accordingly, in retransmission of data, the frame length is unreasonably long, and the overall time required for communication is increased.

SUMMARY OF THE INVENTION

In view of the foregoing deficiencies in the prior art, an object of this invention is to provide a system of retransmitting data in order to correct errors in which the frame length is set to be suitable for a given transmission distance, so that data is efficiently transmitted to correct the errors.

Yet another object of this invention is to define a facsimile system that minimizes retransmission delays to improve overall throughput in the system.

The foregoing and other objects of the invention have been achieved in a data transmitting system in which, according to the invention, a measurement frame is transmitted prior to the start of data transmission. An answer signal to the measurement frame is detected to measure the transmission delay time involved, and according to the transmission delay time thus measured, a frame length and a monitoring time for the answer signal are determined.

This invention will be described with reference to its preferred embodiment and the accompanying drawing.

BRIEF DESCRIPTION OF THE DRAWINGS

The accompanying drawings describe one preferred embodiment of this invention.

DESCRIPTION OF THE PREFERRED EMBODIMENT

Figure 1:
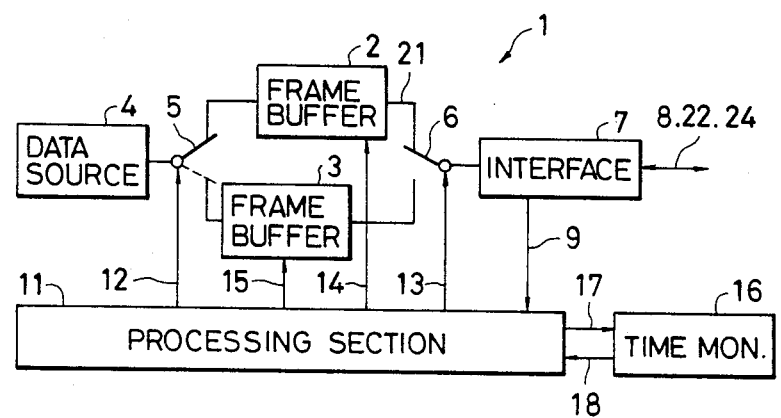
FIG. 1 is a block diagram showing the arrangement of a facsimile unit on the signal transmitting side.

FIG. 1 is a block diagram illustrating a facsimile unit on the signal transmitting side. The facsimile unit 1 has first and second frame buffers 2 and 3. A first change-over mechanism 5 is provided on the input side of the frame buffers 2 and 3, in order to apply data from a data source 4 to either of the frame buffers 2 or 3. A second change-over mechanism 6 is provided on the output side of the frame buffers 2 and 3, so that the output data of the buffers is switched. The output data selected by the second change-over mechanism 6 is applied through a transmission path interface section 7 to a transmission path 8.

On the other hand, an answer signal, which is delivered through the transmission path from the signal receiving side, is detected by the transmission path interface section 7, so that it is applied, as an answer signal detection signal 9 to a processing section 11. The processing section 11 outputs changeover control signals 12 and 13 for controlling the change-over mechanisms 5 and 6 and frame buffer control signals 14 and 15 for controlling the operation of the frame buffers 2 and 3. Furthermore, the processing section 11 supplies a time monitoring control signal 17 to a time monitoring section 16 and receives a time monitoring output signal therefrom.

Assume now that the facsimile unit 1 starts data communication. Prior to this time, the processing section 11 supplies the frame buffer control signal 14 to the first frame buffer 2 to cause it to output a measurement frame. In response to this frame, the first frame buffer 2 shapes a measurement frame 21 having a predetermined frame length and outputs the measurement frame thus shaped. The measurement frame 21 is applied through the second change-over mechanism 6 to the transmission path interface section 7, where it is modulated to be suitable for the transmission path 8. As shown in wavetrain (a) of FIG. 2, it is then applied to the transmission path 8. When output of the measurement frame 21 is suspended, the processing section 11 supplies the time monitoring control signal 17 to the time monitor section 16 to cause it to start a time measurement.

Figure 2:
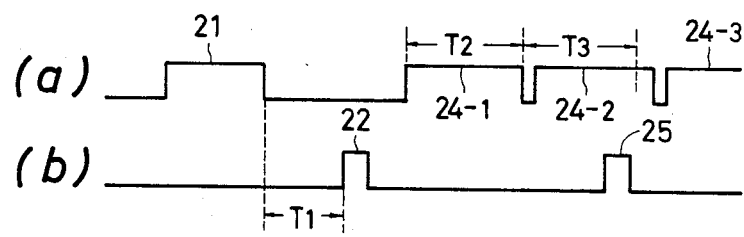
FIG. 2 is a time chart for a description of the principle that data is retransmitted when errors occur with the facsimile unit.

In response to the measurement frame 21, a facsimile unit (not shown) on the signal receiving side provides an answer signal 22 shown as waveform (b) in FIG. 2. The transmission path interface section 7 then outputs the answer signal detection signal 9. When the answer signal detection signal 9 is inputted to the processing section 11, this section stops outputting the time monitoring control signal 17 to the time monitoring section 16. At the same time, the time monitoring section 16 outputs the time monitoring output signal 18 representing the time $T_1$ (FIG. 2) which is the time period in which the time monitoring control signal 17 was supplied to the time monitoring section 16. The processing section 11 determines a frame length $T_2$ in data transmission and a monitoring time $T_3$ for monitoring an answer signal (FIG. 2) according to the time $T_1$. The frame length $T_2$ is set to a value which is longer than the time $T_1$ and can be guaranteed against variations in transmission time. The monitoring time $T_3$ is set to a value which is the time $T_1$ plus the maximum transmission time variation.

The frame length $T_2$ is supplied, as the frame buffer control signal 14 or 15 to the first or second frame buffer 2 or 3. When data, an amount transmitted within the frame length $T_2$, is supplied to the frame buffer 2, the processing section 11 outputs the change-over control signal 12 to trip the first change-over mechanism 5. As a result, predetermined amount of data is supplied to the second frame buffer 3. While the second frame buffer 3 receives the data, the first frame buffer 2 shapes the frame and delivers the frame thus shaped, as the first data frame 24-1 in waveform (a) of FIG. 2 through the transmission path interface section 7 to the transmission path 8. When the first data frame 24-1 has been transmitted, the second change-over mechanism 6 is tripped by the change-over control signal 13, so that, similarly, the data shaped to the frame length $T_2$ is outputted by the buffer 3 and is transmitted as the second data frame 24-2. In this operation, the armature of the first change-over mechanism 5 is tripped, so that data from the data source 4 is supplied to the first frame buffer 2. Thus, similarly, as in the above-described case, data frames 24-3, 24-4, ... having the frame length $T_3$ are transmitted through the transmission path to the signal receiving side.

The facsimile unit on the signal receiving side reproduces the data for every data frame, and outputs the answer signal 25 shown in waveform (b) of FIG. 2 only when no retransmission is required. In the facsimile unit on the signal transmitting side, the time monitoring section 16 starts the monitoring time $T_3$ when transmission of each frame is accomplished. When the answer signal 9 is transmitted within the monitoring time $T_3$, the processing section 11 starts transmission of the next data frame with the aid of the answer detection signal 9. When, on the other hand, no answer signal is detected within the monitoring time $T_3$, that data frame is again transmitted.

Figure 3:
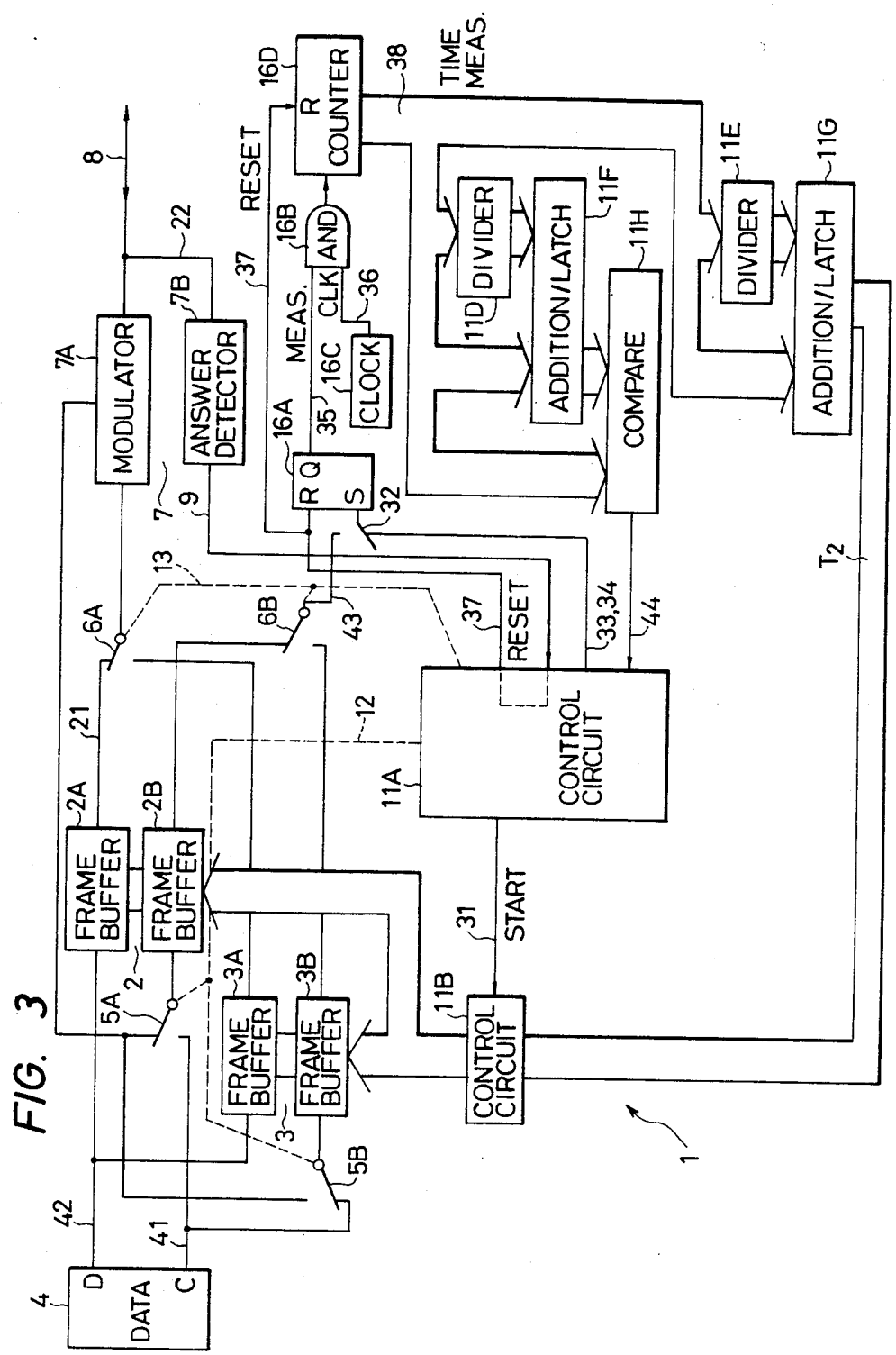
FIG. 3 is a block diagram showing the preferred embodiment of the facsimile unit.
Figure 4:
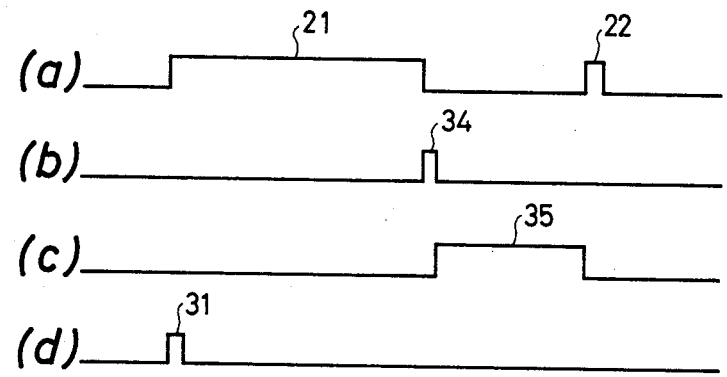
FIG. 4 is a time chart for a description of the operation of determining a frame length and a monitoring time.

FIG. 3 shows a preferred arrangement of the facsimile unit in accordance with this invention. In the facsimile unit 1, the first frame buffer 2 comprises a RAM (random access memory) 2A and a counter 2B, and the second frame buffer 3 comprises a RAM 3A and a counter 3B. A control circuit 11A in the control section outputs, as shown in FIG. 4, waveform (d) a start signal 31 for measuring a transmission delay time prior to the start of communication. The start signal 31 is supplied to a preset value control circuit 11B in the control section. The preset value control circuit 11B applies a preset value, which is temporarily determined for setting a frame length, to the two counters 2B and 3B to preset those buffers. Thereupon, the RAM 2A to which the second change-over mechanism 6 has been initially connected, starts outputting the measurement frame 21 shown in waveform (a) of FIG. 4. The measurement frame, after being modulated by a modulating section 7A in the transmission path interface section 7, is delivered to the transmission path 8.

In this step of determining a frame length, a set signal line 33 is connected through the switch 32 to the set terminal S of a flip-flop circuit 16A in the time monitoring section. When the measurement frame 21 has been transmitted, the control circuit 11A supplies a set signal 34 (waveform (b) in FIG. 4) to the set signal line 33. As a result, the flip-flop circuit 16A is set and an "H (high)" level measurement signal 35 (waveform (c) in FIG. 4) is provided at the output terminal Q. The measurement signal 35 is applied to one input terminal of a 2-input AND circuit 16B in the time monitoring section. The other input terminal of the AND circuit receives a reference clock signal 36 applied by a reference clock signal generating circuit 16C in the time monitoring section. Thus, when the measurement signal 35 is supplied to the AND circuit 16B, the AND circuit outputs the reference clock signal 36. The output signal of the AND circuit 16B is applied to a counter 16D in the time monitoring section. The counter 16D has been reset by a reset signal 37. Therefore, the counter 16D counts the reference clock signal 36 applied thereto.

When the measurement frame 21 reaches the signal receiving side, an answer signal 22 (waveform (a) in FIG. 4) is transmitted back. The answer signal 22 is detected by an answer signal detecting circuit 7B in the transmission path interface section 7. As a result, the answer signal detection signal 9 is outputted by the detecting circuit 7B. The detection signal 9 is applied to the control circuit 11A and simultaneously outputted as the reset signal 37. The reset signal 37 is applied to the reset terminals R of the flip-flop circuit 16A and the counter 16D to reset them. The counter 16D outputs a time measurement signal 38 representing the elapsed time measurement.

The time measurement signal 38 is supplied to first and second dividers 11D and 11E, first and second addition/latch circuits 11F and 11G and a comparator 11H. In the first addition/latch circuit 11F, the time $T_1$ (FIG. 2), is outputted as the time measurement signal immediately before the counter 16D is reset. It is added with a value $T_1/\alpha$ which is outputted by the first divider 11D to the addition/latch 11F for addition. The result of the addition is latched corresponding to the monitoring time $T_3$ (FIG. 2). On the other hand, in the second addition/latch circuit 11G, the time $T_1$ is added to a value $T_1/\beta$ which is outputted by the second divider 11E. The result of the addition is latched as the frame length $T_2$ (FIG. 2). The two constants $\alpha$ and $\beta$ are determined with variations in transmission time or the like taken into account. The frame length $T_2$ latched by the second addition/latch circuit 11G is supplied to the preset value control circuit 11B, to preset a frame length which is suitable for a signal receiving device during data communication.

When the frame length $T_2$ and the monitoring time $T_3$ are determined as described above, a process for data transmission is started. That is, the control circuit 11A outputs the 0-th start signal 31-0 so that present values are supplied to the counters 2B and 3B. With the aid of the change-over control signal 12, the counter 3B is connected through the "B" contact 5B of the first change-over mechanism 5 to the clock terminal C of the data source 4. Under this condition, data 42 is outputted through the data terminal D of the data source in synchronization with the clock signal 41. The data 42 is supplied to the RAM 3A of the second frame buffer 3, the counter for which is in operation at this time, whereby the first data frame 24-1 having the frame length $T_2$ is formed.

Figure 5:
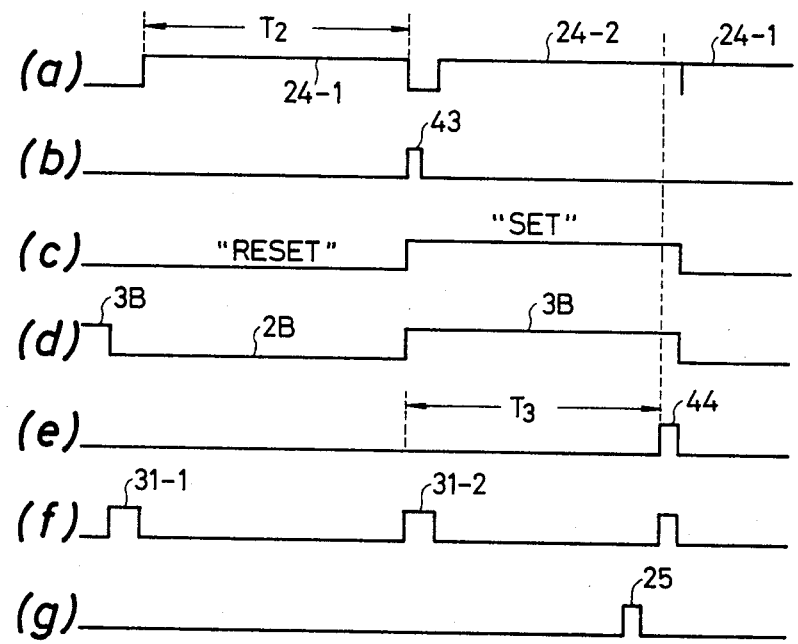
FIG. 5 is a time chart for a description of the transmission of data with a frame length and a monitoring time which are predetermined.

When the first data frame 24-1 has been formed, with the aid of the change-over control signal 13, the RAM 3A is connected to the modulating section 7A through the "A" contact 6A of the second change-over mechanism 6. At the same time, the "A" contact 5A of the first change-over mechanism 5 is tripped over to the counter 2B, so that the data 42 is supplied to the RAM 2A (waveform (d) of FIG. 5). Thereupon, the control circuit 11A produces the first start signal 31-1 (waveform (f) of FIG. 5). As a result, the first data frame 24-1 (waveform (a) of FIG. 5) is supplied from the RAM 2A to the modulating section 7A, and it is delivered as a modulated signal to the transmission path 8.

In this data transmitting step, the switch 32 is connected between the set terminal S of the flip-flop circuit 16 and the "B" switch 6B of the second change-over mechanism 6. When the first data frame 24-1 has been transmitted, as in the above-described case, the first and second change-over mechanisms 5 and 6 are operated. When the "B" switch 6B of the second change-over mechanism 6 is operated, a set signal 43 (waveform (b) of FIG. 5) is applied through the switch 32 thus operated to the set terminal S of the flip-flop circuit 16A to set the flip-flop. At this time instant, the counter 16D starts counting the reference clock signal 36. The counting operation of the counter 16D is continued until the answer signal detecting circuit 7B detects the answer signal 22. The comparator 11H receives as two inputs the monitoring time $T_3$ output of latch 11F and the time measurement signal 38 from counter 16D. It detects when the time required for the circuit 7B to detect the answer signal exceeds the monitoring time $T_3$ and outputs an interrupt signal 44 (waveform (e) of FIG. 5). When the interrupt signal is outputted, transmission of the second data frame 24-2 is stopped and instead transmission of the first data frame 24-1 is started.

When the answer signal 25 is detected within the monitoring time $T_3$, simultaneously the count value of the counter 16D is cleared. Accordingly, in this case no interrupt signal 44 is outputted and transmission of the second data frame 24-2 is carried out without being stopped. When the answer signal 25 is detected within the monitoring time $T_3$ for the data frames 24-1, 24-2, etc., the data is transmitted as is, without being retransmitted.

As is apparent from the above description according to the invention, the frame lengths of data frames are individually determined prior to the start of data communication. Therefore, whether the delay time in the transmission system is long or short, waste in communication time which otherwise may be involved when the data are retransmitted because of the occurrences of errors can be minimized.

I claim:

1. In a data transmission system wherein data is transmitted in data frames having a predetermined length and an answer signal is transmitted back from the signal receiving side upon reception of each data frame, the improvement comprising the steps of:
    transmitting a measuring frame from the signal transmitting side prior to the start of data transmission;
    measuring the transmission time delay from a time difference between transmission of the measuring frame and reception of an answer signal to said measuring frame from the signal receiving side;
    establishing as a function of said transmission delay time a frame length for each data frame and a monitoring time defining a time for monitoring the answer signal; and
    transmitting a data frame having said frame length;
    retransmitting said data frame when no answer signal is detected within said monitoring time.

2. The method of claim 1 further comprising the step of transmitting a succeeding data frame when an answer signal is detected within said monitoring time.

3. A data transmitting system wherein data is transmitted in data frames and an answer signal is transmitted back from the signal receiving side upon reception of each data frame comprising:
    first means to store data and produce a measurement frame output having a first predetermined frame length;
    second means to store data and produce a data frame output having a second predetermined frame length;
    interface means to transmit a data frame output and a measuring frame output, and to receive an answer signal;
    first switch means to switch the input of data from a data source to either said first or second means to store data;
    second switch means to couple the outputs of either said first or said second means to store data to said interface means;
    means to determine the time interval between the transmission of said measurement frame and receipt of said answer signal and to produce both an output frame length signal and a time monitoring output signal; and
    control means, responsive to said interface means and said means to determine the interval, to control said first and second switch means, said control means providing said frame length signal as a control signal, to said first and second means to store data, for controlling the output of data as a function of said time monitoring output signal.

4. The data transmitting system of claim 3, wherein said first means to store comprises a RAM/counter pair, the random access memory adapted to output said measurement frame and the counter receiving said control signal from said control means.

5. The data transmitting system of claim 4, wherein said second means to store data comprises a second RAM/counter pair; the second RAM coupled to said data source and the second counter receiving said control signal from said control means.

6. The data transmission system of claim 5, wherein said first switch means comprises a pair of ganged switch arms, said switch arms operable to alternatively couple each of said counters to a synchronizing clock output from a data source.

7. The data transmission system of claim 5, wherein said second switch means further comprises means to alternately switch the outputs of each of said counters to said means to determine the time interval between transmission of a data frame and said answer signal.

8. The data transmission system of claim 3, wherein said means to produce said frame length signal and said time monitoring signal comprise both; timing means to determine the time interval between the transmission of said measurement frame and reception of said answer signal; and signal producing means to produce a time measurement signal, and further comprising first latch means for receiving said time measurement signal and for producing said frame length signal as a function of variations in transmission time which is suitable for a signal receiving device during data communication.

9. The data transmission system of claim 8 further comprising second latch means for receiving said time measurement signal and for producing a time monitoring output when transmission of each frame is accomplished, a comparator for receiving both said time monitoring output and a second input comprising said time measurement signal, said comparator producing an interrupt signal to said control means when said answer signal exceeds said monitoring time whereby said first data frame is retransmitted.

10. The data transmission system of claim 8, wherein said timing means comprises a resettable counter receiving clock pulse and initiating a count at the end of transmission of a data frame and means to reset said counter when said answer signal is received.

* * * * *